United States Patent
Kawano (10) Patent No.: US 8,918,202 B2
(45) Date of Patent: Dec. 23, 2014

(54) CONTROLLING MOBILE DRIVE UNITS WITH ACTIVE MARKERS

(75) Inventor: Yasushi Kawano, Yotsukaido (JP)

(73) Assignee: Amazon Technologies, Inc., Reno, NV (US)

( * ) Notice: Subject to any disclaimer, the term of this patent is extended or adjusted under 35 U.S.C. 154(b) by 85 days.

(21) Appl. No.: 13/590,547

(22) Filed: Aug. 21, 2012

(65) Prior Publication Data

US 2014/0058556 A1 Feb. 27, 2014

(51) Int. Cl.
*G06F 7/00* (2006.01)

(52) U.S. Cl.
USPC ........... 700/216; 700/213; 700/228; 700/229; 700/245; 700/253

(58) Field of Classification Search
None
See application file for complete search history.

(56) References Cited

U.S. PATENT DOCUMENTS

| | | | |
|---|---|---|---|
| 4,361,202 A * | 11/1982 | Minovitch | 180/168 |
| 4,379,497 A * | 4/1983 | Hainsworth et al. | 180/168 |
| 6,748,292 B2 | 6/2004 | Mountz | |
| 6,895,301 B2 | 5/2005 | Mountz | |
| 6,950,722 B2 | 9/2005 | Mountz | |
| 7,402,018 B2 | 7/2008 | Mountz et al. | |
| 7,826,919 B2 | 11/2010 | D'Andrea et al. | |
| 7,850,413 B2 | 12/2010 | Fontana | |
| 7,873,469 B2 | 1/2011 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,068,978 B2 | 11/2011 | D'Andrea et al. | |
| 8,170,711 B2 | 5/2012 | D'Andrea et al. | |
| 8,220,710 B2 | 7/2012 | Hoffman et al. | |
| 8,239,291 B2 | 8/2012 | Hoffman et al. | |
| 8,280,546 B2 | 10/2012 | D'Andrea et al. | |
| 8,280,547 B2 | 10/2012 | D'Andrea et al. | |
| 8,311,902 B2 | 11/2012 | Mountz et al. | |
| 8,412,400 B2 | 4/2013 | D'Andrea et al. | |
| 8,444,369 B2 | 5/2013 | Watt et al. | |
| 8,483,869 B2 | 7/2013 | Wurman et al. | |
| 8,538,692 B2 | 9/2013 | Wurman et al. | |
| 8,606,392 B2 | 12/2013 | Wurman et al. | |
| 2007/0271011 A1 * | 11/2007 | Lee et al. | 701/25 |
| 2010/0234991 A1 * | 9/2010 | Zini et al. | 700/248 |
| 2011/0153063 A1 | 6/2011 | Wurman et al. | |
| 2012/0143427 A1 | 6/2012 | Hoffman et al. | |
| 2012/0282070 A1 | 11/2012 | D'Andrea et al. | |
| 2013/0054005 A1 | 2/2013 | Stevens et al. | |
| 2013/0103552 A1 | 4/2013 | Hoffman et al. | |
| 2013/0173049 A1 | 7/2013 | Brunner et al. | |
| 2013/0302132 A1 | 11/2013 | D'Andrea | |

\* cited by examiner

*Primary Examiner* — Yolanda Cumbess
(74) *Attorney, Agent, or Firm* — Baker Botts L.L.P.

(57) ABSTRACT

A method of controlling a mobile drive unit includes detecting, by a mobile drive unit at a first location, an active marker at the first location. The mobile drive unit is a self-powered robotic device configured to move independently in a workspace in response to instructions received from the active marker. A management module transmits an instruction to the active marker. The active marker emits a signal detectable by the mobile drive unit, the signal comprising the instruction. The mobile drive unit receives the instruction from the active marker for the mobile drive unit to perform a task.

22 Claims, 5 Drawing Sheets

CONTROLLING MOBILE DRIVE UNITS WITH ACTIVE MARKERS

BACKGROUND

Inventory systems, such as those in e-commerce warehouses, distribution centers, manufacturing facilities and the like, may be used to fulfill orders for various inventory items. As inventory systems grow in size, such inventory systems face an increasingly complex problem of meeting demand for fulfillment of multiple orders at or near the same time. The increasing complexity of fulfilling such orders may contribute to decreasing efficiency and increasing costs.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems of the present disclosure may utilize one or more mobile drive units to automatically retrieve inventory holders from warehouse storage. In some embodiments, mobile drive units may be self-powered robotic devices configured to move freely about the warehouse. Inventory holders may store inventory items. Inventory holders may be transported by mobile drive units to an inventory station. The inventory station may include a human operator and/or automated equipment to remove desired inventory items from the inventory holders and complete orders. The ability for mobile drive units to transport inventory items to an inventory station rather than or in addition to workers manually retrieving inventory items from stationary racks may vastly increase efficiency and productivity of the inventory system. For example, by utilizing mobile drive units, an inventory system may be capable of fulfilling more orders per hour than previous solutions.

Mobile drive units may move about the warehouse and/or retrieve inventory holders in response to commands and/or instructions received from an automated guidance system. For example, a management module may control administration of certain elements and/or tasks within the warehouse system. The management module may transmit information to control movement of mobile drive units, such as task assignments. Certain embodiments of the present disclosure provide a system and method for controlling a mobile drive unit with active markers. Active markers may communicate commands and/or instructions to mobile drive units from a management module. Active markers may additionally or alternatively communicate commands and/or instructions to mobile drive units from other mobile drive units. Thus, active markers may form all or a part of an automated guidance system used to control mobile drive units.

Active markers may be arranged in any suitable pattern within the workspace and may be configured to communicate with mobile drive units when in suitably close proximity to a given mobile drive unit. In some embodiments, active markers may communicate using one or more light emitting diodes (LEDs). Active markers may emit a signal from the LEDs that the mobile drive unit recognizes as a command and/or instruction. Active markers may aid in determining the location of a mobile drive unit within the warehouse. A mobile drive unit may detect an active marker when the mobile drive unit is in proximity to the active marker. For example, the mobile drive unit may detect an active marker disposed on or near the floor of a warehouse using a camera or photo detector mounted beneath the mobile drive unit. As another example, the mobile drive unit may detect an active marker disposed on or near the ceiling of a warehouse using an appropriately located camera or photo detector. The mobile drive unit and/or management module may store a virtual map of active markers within its control system. Detecting the active marker may thus allow the mobile drive unit and/or a management module to maintain an accurate indication of the location of the mobile drive unit within the warehouse. Additionally, the active marker may be configured to communicate information to the mobile drive unit. The information may provide instructions and/or commands to the mobile drive unit, such as to proceed to a second location, to lift an inventory holder, and/or to complete any suitable task the mobile drive unit is capable of performing. Thus, the disclosed embodiments may be capable of controlling mobile drive units with active markers.

The ability for mobile drive units to be controlled by active markers may result in one or more technical advantages. For example, the ability to control mobile drive units with active markers may result in certain operational efficiencies, such as reducing the operational load on a management module responsible for coordinating and administrating tasks within the inventory system. For example, in some embodiments, a management module may communicate with mobile drive units using one or more wireless protocols. By utilizing active markers to control mobile drive units, wireless bandwidth required by the automated guidance system may be reduced and/or eliminated.

Figure 1:
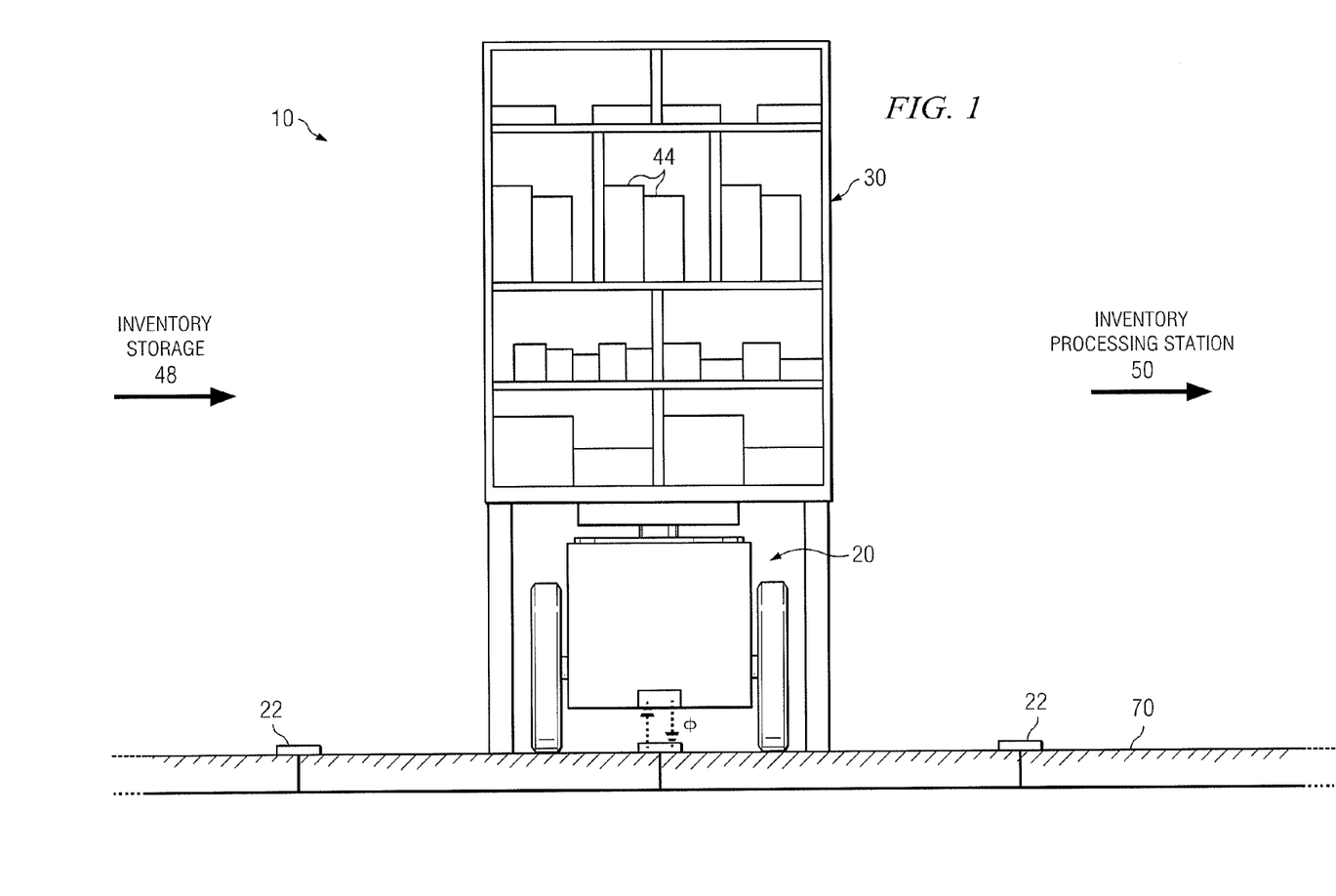
FIG. 1 illustrates an example system for controlling a mobile drive unit with active markers.

FIG. 1 illustrates an example system 10 for controlling a mobile drive unit 20 with active markers 22. System 10 includes one or more mobile drive units 20, active markers 22, one or more inventory holders 30, and one or more inventory stations 50, disposed within a workspace 70. System 10 may, for example, be an inventory processing warehouse. Inventory holder 30 may store multiple inventory items 44. In general, mobile drive units 20 are operable to transport inventory holder 30 from one location to another within inventory system 10. For example, a mobile drive unit 20 may move to a given inventory holder 30 that is located in inventory storage 48, lift inventory holder 30, and while lifting inventory holder 30 proceed to an inventory processing station 50.

Mobile drive units 20 perform tasks, such as transporting inventory holder 30 from inventory storage 48 to inventory processing station 50, in response to one or more tasks assigned by a management module 15. Tasks may be communicated to mobile drive unit 20 using a wireless interface and/or using one or more active markers 22. As illustrated, active markers 22 may form a pattern on or near a surface of a workspace (such as a floor and/or ceiling), and a mobile drive unit 20 may be configured to move from one active marker 22 to another in accordance with instructions received from management module 15 and/or an active marker 22. Mobile drive unit 20 may include a sensor that detects active marker 22 and/or receives signals transmitted and/or emitted by active marker 22 in order to maintain an accurate indication of the location of the mobile drive unit 20 within workspace 70 and/or to aid in navigation when moving within the workspace. Active marker 22 may be configured to communicate commands and/or instructions to mobile drive unit 20, such as instructions to complete a task. For example, as a given mobile drive unit 20 traverses one or more segments of a path in workspace 70, an active marker 22 in proximity to the mobile drive unit 20 may communicate the next segment of the path. An active marker 22 in proximity to the mobile drive unit 20 may additionally or alternatively provide other instructions to the mobile drive unit 20, such as to complete a turn, execute a rotation maneuver, and/or lift or lower an inventory holder 30. Additionally or in the alternative, mobile drive unit 20 may include a transmitter and/or emitter capable of communicating identifying information and/or other information to active markers 22. Accordingly, mobile drive unit 20 may communicate with active markers 22 such that management module 15 and/or other components of system 10 may update the location of the mobile drive unit 20 within workspace 70. Additional details regarding example embodiments of mobile drive unit 20, inventory holders 30, and active markers 22 will be explained in more detail below with respect to FIG. 2.

Figure 2:
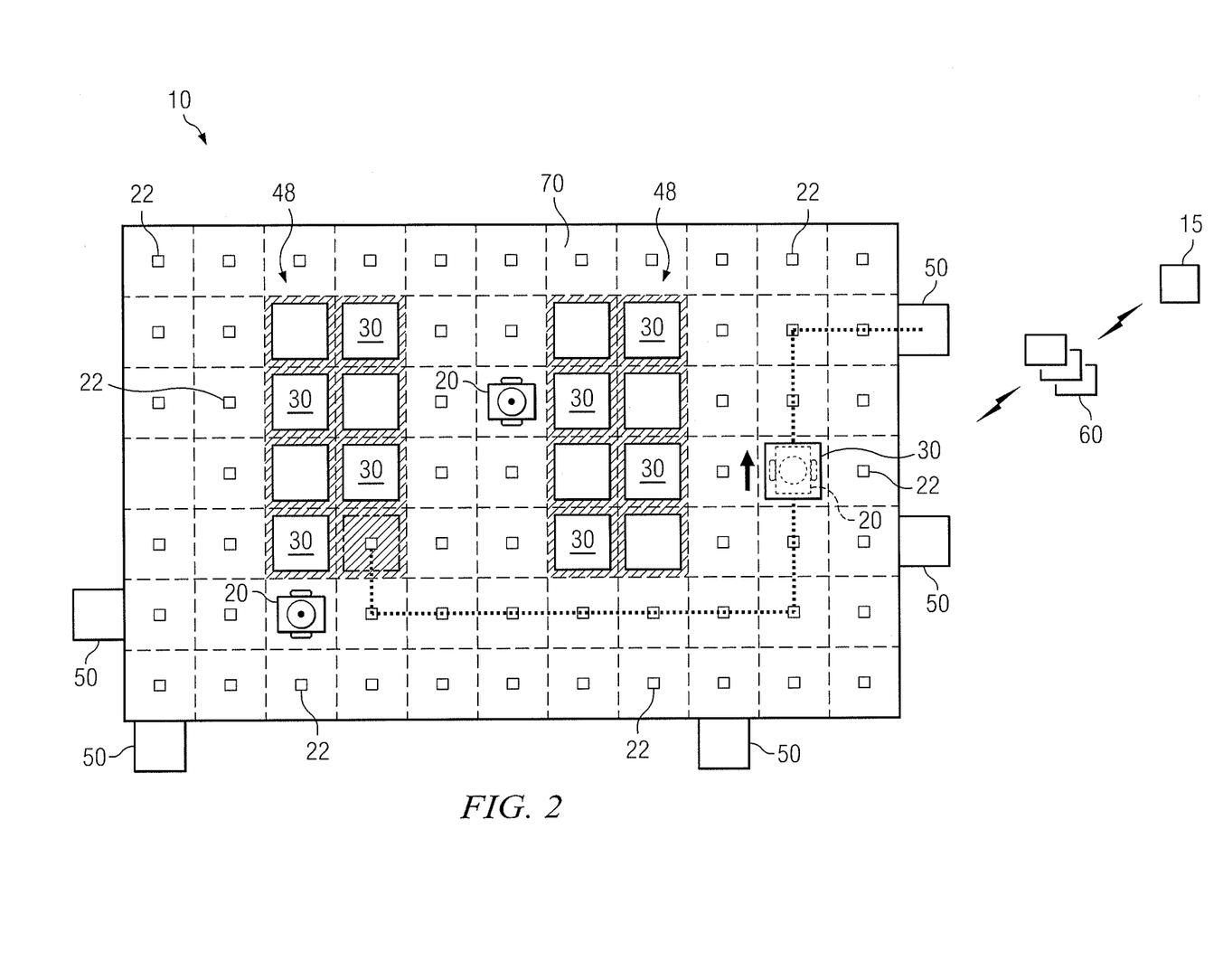
FIG. 2 illustrates an example system for controlling a mobile drive unit with active markers in a workspace.

FIG. 2 illustrates another example system 10 for controlling a mobile drive unit 20 with active markers 22 in a workspace 70. In general, management module 15 receives and processes various orders for inventory items 44 stored in inventory holders 30 and issues tasks 60 to various components of system 10 for completion. Mobile drive units 20 may receive task assignments from management module 15 and/or active markers 22 and may be operable to transport inventory holders 30 to various locations within workspace 70. For example, mobile drive unit 20 may transport a given inventory holder 30 to one or more inventory stations 50. The movement and coordination of mobile drive units 20 within workspace 70 may be controlled by an array of active markers 22 arranged in a pattern in workspace 70.

Management module 15 assigns tasks to appropriate components of inventory system 10 and coordinates operation of the various components in completing tasks 60. Tasks 60 relate to the movement and processing of inventory items and/or the management and maintenance of the components of inventory system 10. Management module 15 selects components of inventory system 10 to perform various tasks 60 and/or may communicate appropriate commands and/or instructions to the selected components to facilitate completion of tasks 60. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. For example, management module 15 may determine various tasks 60 for individual mobile drive units 20 to complete, while mobile drive units 20 may determine paths to their assigned destinations and/or may maintain reservation information regarding various workspace cells within workspace 70. As another example, management module 15 may communicate groups of tasks 60 associated with multiple mobile drive units 20 to a mobile drive unit 20 designated as a master mobile drive unit. The master mobile drive unit 20 may communicate tasks 60 to other mobile drive units 20 by, for example, using active markers 22. A more detailed discussion of an example embodiment in which master mobile drive units 20 are used is discussed below with respect to FIG. 4.

Mobile drive units 20 represent any suitable combination of devices and components operable to move inventory holders 30 between locations within workspace 70. Mobile drive units 20 may be designed to couple, interface, dock or otherwise connect with inventory holders 30. For example, mobile drive units 20 may be configured to move beneath a given inventory holder 30 and/or lift the inventor holder 30 using a docking head or other appropriate coupling structure. Mobile drive units 20 include one or more wheels and may be capable of moving to any appropriate location within workspace 70. In some embodiments, mobile drive units 20 represent independent, self-powered robotic devices configured to freely move about workspace 70. Additionally, in particular embodiments of inventory system 10, mobile drive units 20 may be configured to utilize conveyance equipment to move within workspace 70 and/or between separate portions of workspace 70.

Mobile drive units 20 may communicate with active markers 22 in any suitable manner. For example, mobile drive units 20 may communicate with active markers 22 using a sensor operable to receive and/or detect signals from an active marker 22. Mobile drive units 20 may additionally or alternatively transmit and/or emit signals detectable by an active marker 22. In some embodiments, mobile drive unit 20 may include an active marker transceiver operable to communicate information to and receive information from active markers 22. In example embodiments, mobile drive units 20 may include one or more cameras and/or photo detectors that sense light signals emitted by active markers 22. Mobile drive units 20 may also, in some embodiments, include suitable image- and/or video-processing components, such as an appropriately-programmed digital signal processor, to allow the mobile drive unit 20 to detect an active marker 22 within the camera's field of view. Mobile drive units 20 may also include one or more LEDs to emit light signals that may be detectable by active markers 22. The cameras and photo detectors in conjunction with the LEDs may in some embodiments form an active marker transceiver. Mobile drive units 20 may be operable to vary and/or modulate the signal emitted by LEDs in order to communicate various information to active markers 22. It should be noted that while a particular form of communication with active markers 22 is described, any appropriate communication method may be used, such as near-field communication (NFC), radio frequency identification devices (RFID), infrared, display devices, or other communication technology. In some embodiments, mobile drive units 20 may also be capable of communicating with management module 15, other mobile drive units 20, active markers 22 and/or inventory stations 50 in any suitable manner. For example, mobile drive units 20 may communicate using Wi-Fi (IEEE 802.11), Bluetooth (IEEE 802.15), Infrared Data Association standards, or any other appropriate wireless communications protocol. In some embodiments, mobile drive units 20 may be capable of communicating with active markers 22 according to one or more visible light communications standards. For example, active markers 22 may communicate using IEEE 802.15 WPAN Task Group 7 (TG7), JEITA CP-1221/1222, ARIB STD-T50 Ver. 4.0, IrDA Visible light communication standard Ver. 1.0, and/or any other appropriate standards-based or proprietary visible light communications protocol.

Mobile drive units 20 may include appropriate sensors to detect other mobile drive units 20 within workspace 70. Mobile drive units 20 may thereby facilitate movement and/or avoid collisions. Mobile drive units 20 may communicate information to active markers 22 and/or management module 15 to assist in the management of inventory system 10. For example, mobile drive unit 20 may communicate its location relative to a fixed location within workspace 70 to an active marker 22 at the fixed location. Mobile drive unit 20 may store a virtual map of the components within workspace 70 to further aid in navigation and movement within workspace 70. For example, mobile drive units 20 may store a virtual map of the location of various active markers 22, the known location of other mobile drive units and/or inventory holders 30. The contents and operation of an example embodiment of a mobile drive unit 20 are discussed further below with respect to FIG. 3. In some embodiments, management module 15 may additionally or alternatively store a virtual map of workspace 70. Active marker 22 may transmit an identifier of mobile drive unit 20 to management module 15. Management module 15 may determine the location of mobile drive units 20 by determining, based on the identifier, the location of active marker 22 within the virtual map and/or determining that mobile drive unit 20 is at the location of active marker 22 in the virtual map.

Active markers 22 represent any combination of devices and components operable to communicate with mobile drive units 22 at fixed locations within workspace 70. Active markers 22 may communicate with mobile drive units 20 using a sensor operable to receive and/or detect signals associated with a mobile drive unit 20. Active markers 22 may also transmit and/or emit signals that are detectable by mobile drive unit 20. In some embodiments, active marker 22 may represent a device operable to communicate information to mobile drive units 20 by emitting a light signal from one or more LEDs. For example, active marker 22 may include an array of LEDs that are selectively enabled to form a pattern recognizable as an instruction by the mobile drive unit 20. Additionally or in the alternative, active marker 22 may transmit pulse-modulated light signals that may be interpreted by the mobile drive unit 20 as instructions. Additionally or alternatively, each active marker 22 may selectively enable certain LEDs in order to form a two-dimensional pattern recognizable by mobile drive unit 20. In some embodiments, active markers 22 may be capable of communicating with mobile drive units 20 according to one or more visible light communications standards. For example, active markers 22 may communicate using IEEE 802.15 WPAN Task Group 7 (TG7), JEITA CP-1221/1222, ARIB STD-T50 Ver. 4.0, IrDA Visible light communication standard Ver. 1.0, and/or any other appropriate standards-based or proprietary visible light communications protocol.

Active marker 22 may additionally or alternatively include a sensor to detect light signals emitted by mobile drive units 20, such as a camera and/or photo detector. In some embodiments, active marker 22 may include suitable image and/or video-processing components, such as an appropriately-programmed digital signal processor, to allow active marker 22 to detect a mobile drive unit 20 within the camera's field of view. As noted above with respect to mobile drive unit 20, however, active marker 22 is not limited to a particular communication technology and may be operable to communicate using NFC, RFID, infrared, display devices, or other appropriate communication technology, including any of the aforementioned wireless communication technologies. Active markers 22 may also represent networked devices operable communicate with remote devices, such as management module 15, mobile drive unit 20 and/or other active markers 22.

Active markers 22 are generally operable to aid in the maintenance of accurate indications of the location of mobile drive units 20 within workspace 70 and/or to aid in navigation when moving within workspace 70. Active markers 22 may be disposed in a pattern within workspace 70. For example, the pattern may be a two-dimensional grid, and active markers 22 may be disposed at the intersections of lines of the grid. As illustrated, workspace 70 may be arranged as a plurality of workspace cells. Active markers 22 may be disposed at or near the center of each cell. Mobile drive units 20 may be configured to move from the center of one workspace cell to the center of an adjacent workspace cell. When mobile drive unit 20 reaches the center of the workspace cell, mobile drive unit 20 may detect and/or communicate with the active marker 22 in the cell. The fixed location of particular active markers 22 within the pattern may be known to management module 15 and/or mobile drive units 20. Active marker 22 may be capable of transmitting and/or emitting a unique identifier to mobile drive unit 20 when mobile drive unit 20 is in proximity of the active marker 22. When a mobile drive unit detects a particular active marker 22 when in proximity to the active marker 22, the mobile drive unit 20 may be capable of determining its fixed location within workspace 70 based, for example, on the unique identifier of the active marker 22.

Active marker 22 may be capable of communicating with other components of system 10 using one or more networks in addition to communicating with the mobile drive unit 20 in proximity to active marker 22. For example, active marker 22 may transmit information to other active markers 22, mobile drive units 20, and/or management module 15. In some embodiments, active marker 22 may receive identifying information from a mobile drive unit 20, and active marker 22 may be operable to transmit information to other components of system 10 identifying the location of mobile drive unit 20. Thus, the other components of system 10 may be capable of tracking the location of various mobile drive units 20 based on information received from active markers 22. As another example, active marker 22 may receive various information from mobile drive unit 20 and/or management module 15. Active marker 22, in response to receiving such information, may be capable of communicating the information to another active marker 22 in communication with mobile drive unit 20 associated with the information. For example, active marker 22 may receive information from a given mobile drive unit 20 and/or management module 15, where the information includes commands and/or instructions for a particular mobile drive unit 20 to complete a task 60. The information may identify the location of active marker 22 in communication with the particular mobile drive unit 20. Active marker 22 may then transmit the information to another active marker 22 in communication with the particular mobile drive unit 20. Additionally or in the alternative, active marker 22 may determine the location of another active marker 22 in communication with the particular mobile drive unit 20 based on information stored by active marker 22.

Inventory holders 30 store inventory items. In some embodiments, inventory holders 30 include multiple storage bins each capable of holding one or more inventory items. Alternatively or in addition, inventory holders 30 may include a rack of shelves, each shelf capable of carrying one or more inventory items. Inventory holders 30 are capable of coupling and/or docking with mobile drive units 20 and being carried, rolled, or otherwise moved by mobile drive units 20. Inventory holder 30 may include a plurality of faces. Each bin of inventory holder 30 may be accessible through one or more faces of the inventory holder 30. For example, in some embodiments, inventory holder 30 may include four faces, and mobile drive unit 20 may be operable to rotate inventory holder 30 at appropriate times within workspace 70 to present a particular face containing the inventory items needed at inventory station 50. An example embodiment of an inventory holder 30 is illustrated in FIG. 1.

Inventory stations 50 represent locations designated for the completion of particular tasks 60 involving inventory items 44. Such tasks 60 may include the removal of inventory items from inventory holders 30, the introduction of inventory items into inventory holders 30, the counting of inventory items in inventory holders 30, the decomposition of inventory items (e.g. from pallet- or case-sized groups to individual inventory items), and/or the processing or handling of inventory items in any other suitable manner. In particular embodiments, inventory stations 50 may represent the physical locations where a particular task 60 involving inventory items can be completed within workspace 70. In alternative embodiments, inventory stations 50 may represent both the physical location and also any appropriate equipment for processing or handling inventory items, such as scanners, for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing or counting inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure. In addition, workspace 70 may include multiple floors of a warehouse and/or shipping facility.

In operation, inventory system 10 may receive various orders for inventory items 44 stored within inventory holders 30. Management module 15 may coordinate fulfillment of orders by assigning tasks 60 to various components of system 10. For example, management module 15 may assign tasks to one or more mobile drive units 20 within workspace 70. Tasks 60 may be assigned by management module 15 based on various determinations that are calculated to fulfill various orders in a timely and efficient manner. For example, management module 15 may communicate tasks 60 for one or more mobile drive units 20 based on their relative vicinity to the inventory holders 30 holding inventory items 44 desired to complete an given order. In the illustrated embodiment, for example, mobile drive unit 20 may complete a given task 60 that includes retrieving a particular inventory holder 30 from inventory storage 48 and transporting inventory holder 30 to an inventory station 50. Mobile drive unit 20 may transport inventory holder 30 by proceeding along a path that includes various segments, where each segment is defined by the distance from one active marker 22 to another active marker 22.

Management module 15 may, in some embodiments, control active markers 22 and/or communicate instructions associated with the one or more tasks 60 to active markers 22. Mobile drive units 20 may, in turn, receive information from active markers 22 associated with one or more task assignments 60 when in sufficient proximity to a particular active marker 22. In some embodiments, management module 15 may be capable of transmitting one or more tasks 60 to a mobile drive unit 20 designated to receive various tasks 60 on behalf of other mobile drive units 20. The designated mobile drive unit 20 may then control active markers 22 and/or communicate with active markers 22 to communicate information associated with tasks 60 to other mobile drive units 20. A more detailed explanation of an example of such an embodiment is discussed below with respect to FIG. 4.

A given mobile drive unit 20 may move to a location of an active marker 22 within workspace 70, which may be a fixed location. When in sufficient proximity to the active marker 22, mobile drive unit 20 may detect active marker 22 and/or may begin communicating with active marker 22. A mobile drive unit 22 may, for example, detect active marker 22 when active marker 22 comes into the field of view of an active marker transceiver in mobile drive unit 20. Mobile drive unit 20 may then receive information communicated by active marker 22. Mobile drive unit 20 may, for example, detect a light signal emitted by active marker 22. The light signal may have a pattern that mobile drive unit 20 may recognize and/or interpret as an instruction. In some embodiments, other appropriate communications technologies may be utilized. The information received by mobile drive unit 20 may be an instruction to complete task 60. Task 60 may be associated with an order. For example, task 60 may be to proceed from the location of active marker 22 to a second location. The second location may be the location of another active marker 22. The second location may additionally or alternatively be the location of inventory holder 30. Task 60 may include lifting inventory holder 30 at the second location and/or may include transporting inventory holder 30 to inventory station 50. In some embodiments, each of these portions of task 60 may be sub-tasks that are received by active marker 22 at each location after completing the previous task. In some embodiments, the information may include instructions to complete other tasks mobile drive unit 20 may be capable of performing, including but not limited to a turn and/or a rotation maneuver in which mobile drive unit 20 rotates inventory holder 30.

In some embodiments, active marker 22 may, based on the signal communicated by the active marker 22, identify itself uniquely to mobile drive unit 20. Additionally or alternatively, the active marker 22 may simply have a bar code or other physical label that differentiates active marker 22 from other active markers 22 within workspace 70. Accordingly, mobile drive unit 20 may utilize active markers 22 to aid in navigation and movement within workspace 70. Mobile drive unit 20 may analyze the communication of active marker 22 to determine a location of mobile drive unit 20 within workspace 70. Mobile drive unit 20 may be able to determine its location in workspace 70 based on the information received from active marker 22. For example, mobile drive unit 20 may determine the location of active marker 22 within a virtual map of components in system 10 stored by mobile drive unit 20. The virtual map may include the fixed location of active markers 22 within workspace 70. In some embodiments, mobile drive unit 20 may transmit presence information to active marker 22. Presence information may include the identity of mobile drive unit 20. Active marker 22 may determine the identity of mobile drive unit 20 based on the presence information. Active marker 22 may transmit the presence of mobile drive unit 20 to other active markers 22 within workspace 70. Active marker 22 may additionally or alternatively communicate location updates of other mobile drive units 20, inventory holders 30 and/or other appropriate components of system 10 to mobile drive unit 20 in proximity to the active marker 22. Thus, active marker 22 may be capable of providing mobile drive unit 20 with the updated location status of the various components of system 10. Alternatively or in addition, in some embodiments, management module 15 may store a virtual map of the components of system 10. Management module 15 may determine the location of mobile drive unit 20 within workspace 70 based on presence information from mobile drive unit 20 transmitted by active marker 22 to management module 15. The presence information may indicate that a particular mobile drive unit 20 is in proximity to a particular active marker 22.

Based on information received from active marker 22, mobile drive unit 20 may be capable of proceeding along a path to a destination. When at the end of a given segment, active marker 22 may communicate a portion of the path to mobile drive unit 22. Mobile drive unit 20 may be capable of proceeding along a path by moving along segments from the center of one workspace cell to another workspace cell. Thus, the mobile drive unit 20 may move to the destination, by traversing the path in a segment-by-segment manner. Active marker 22 may instruct mobile drive unit 20 to proceed to one of the workspace cells adjacent to the active marker 22. Thus, mobile drive unit 20 may, in some embodiments, proceed along a path without necessarily knowing the next segments in advance. However, in other embodiments, mobile drive unit 20 may know and/or calculate the path. The path planning component may, in various embodiments, be included within management module 15 and/or one or more particular mobile drive units 20. In some embodiments, one or more mobile drive units 20 may be designated to plan paths for other mobile drive units 20. The component responsible for path planning may utilize knowledge of current congestion, historical traffic trends, task prioritization, and/or other appropriate considerations to select an optimal path for mobile drive unit 20 to take in getting to the destination. Additionally, in planning the path (or in assigning tasks), the path planning component may make informed decisions regarding the use of lifts, conveyors, ramps, tunnels, and/or other conveyance equipment or features of workspace 70 to facilitate the movement of the relevant mobile drive unit 20.

As noted above, mobile drive units 20 may, in some embodiments, each plan their own paths to a given destination. Based on information received from active marker 22 indicating the mobile drive unit 20's location and/or location information of other components within workspace 70, mobile drive unit 20 may be capable of planning a path to a destination while avoiding various obstacles, such as other mobile drive units 20. A given mobile drive unit 20 may also receive path planning information from other mobile drive units 20 to facilitate planning its own path. In some embodiments, mobile drive unit 20 may be capable of planning a path based on the information received by active marker 22. In some embodiments, mobile drive units 20 may request a reservation of a workspace cell before moving into the cell. For example, mobile drive unit 20 may make a reservation request by communicating with an active marker 22 and/or by communicating with management module 15. Mobile drive unit 20 may proceed into the workspace cell if the request is granted and may not proceed into the workspace cell if the request is denied. In some embodiments, mobile drive units 20 may make reservation requests by communicating with active markers 22.

Mobile drive unit 20 may also indicate that a given task 60 is completed to active marker 22. For example, if a previous task 60 was to proceed to active marker 22, mobile drive unit 20 may indicate that the previous task 60 is complete when the mobile drive unit 20 reaches active marker 22. As another example, task 60 may be to lift or lower an inventory holder 30 at active marker 22. After indicating a previous task 60's completion, mobile drive unit 20 may request a new task 60 from active marker 22. Additionally or alternatively, mobile drive unit 20 may communicate the status of task 60 directly with management module 15 and/or a mobile drive unit 20 designated to control other mobile drive units 20.

Components of inventory system 10, such as active markers 22 and/or mobile drive units 20, may provide information to management module 15 regarding the current state and/or condition of inventory system 10, including the status of mobile drive units 20, inventory holders 30, and/or other components of inventory system 10. This may allow management module 15 to utilize feedback from the relevant components to update algorithm parameters, adjust policies, or otherwise modify its decision-making to respond to changes in operating conditions or the occurrence of particular events. Thus, according to these teachings, management module 15 may generate tasks 60, allot usage of system resources, and direct the completion of tasks 60 by components of system 10 using one or more active markers 60. The use of active markers 22 in communication with mobile drive units 20 may reduce and/or eliminate the operational load of management module 15, for example, by offloading path planning and/or reservation activities from management module 15.

Figure 3:
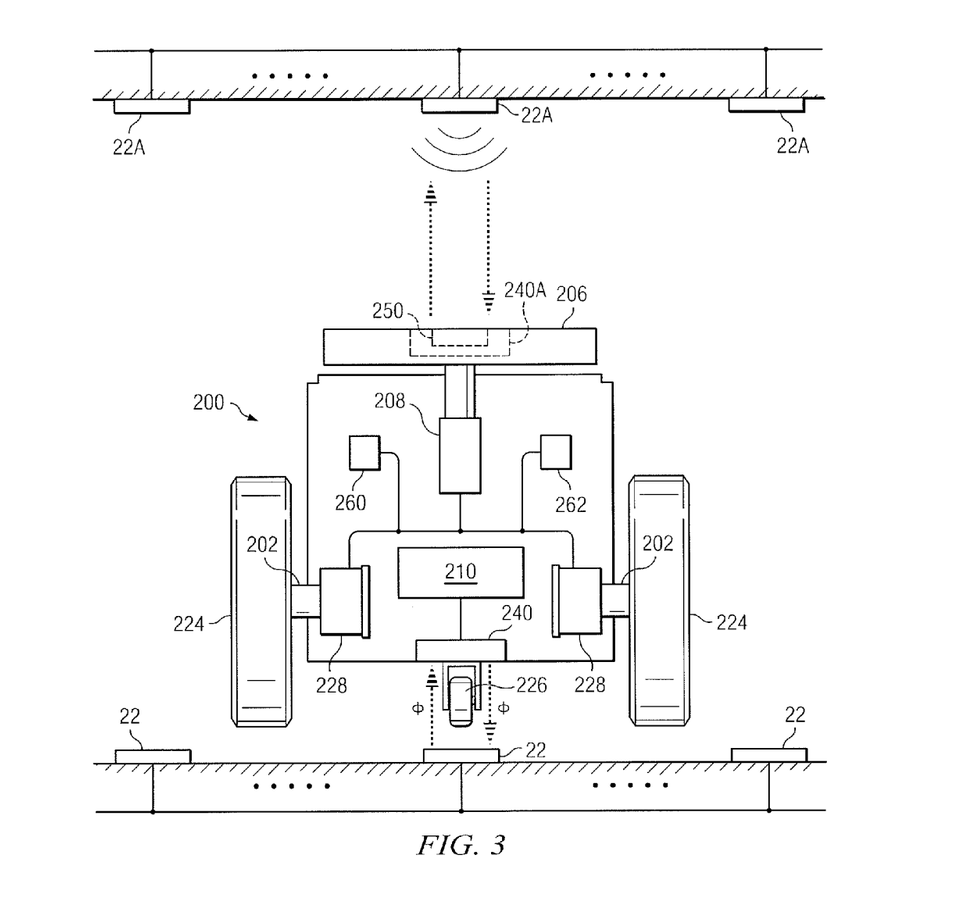
FIG. 3 illustrates an example mobile drive unit in communication with an active marker.

FIG. 3 illustrates an example mobile drive unit 20 in communication with an active marker 22. Mobile drive unit 20 includes a drive module 200, a docking head 206, a docking actuator 208, and a control module 210. Drive module 200 includes motorized wheels 224, stabilizing wheels 226 and wheel actuators 228. Additionally, mobile drive unit 20 may include one or more sensors and/or transceivers configured to detect or determine the location of mobile drive unit 20, inventory holder 30, and/or other appropriate elements of inventory system 10. In the illustrated embodiment, mobile drive unit 20 includes a active marker transceiver 240 and 240a, a holder sensor 250, an obstacle sensor 260, and an identification signal transmitter 262. It should be noted that in the illustration, mobile drive unit 20 is shown as being slightly above the surface of workspace 70. This is done for illustrative purposes to facilitate depiction of communication between active marker 22 and active marker transceiver 240 and/or 240a. Moreover, it should be noted that while in the illustrated embodiment, active markers 22 are disposed above and below mobile drive unit 22 respectively on the ceiling and floor, that any appropriate arrangement of active markers may be used. For example, particular embodiments may include only active markers 22 disposed on or near a surface of a floor.

In other embodiments, active markers 22 may only be disposed on or near a ceiling. Alternatively, some combination of active markers on the floor and ceiling may be used.

Drive module 200 represents a suitable collection of devices, actuators, and components to control the translational movement of the mobile drive unit 20 with respect to a surface of workspace 70. For example, in response to control signals received by control module 210, drive module 200 may control actuators 228 to change the rate of rotation of wheels 224 to accomplish translational movement. As shown, actuators 228 may independently control wheels 224. Actuators 228 may include any appropriate power plant, such as an engine and/or motor. Drive module 200 propels mobile drive unit 20 and, when mobile drive unit 20 and inventory holder 30 are docked, inventory holder 30. One motorized wheel 224 is located at each end of a motorized axle, and one stabilizing wheel 226 is positioned at each end of mobile drive unit 20. For example, in the illustrated embodiment, motorized wheels 224 are operable to rotate in a first direction to propel mobile drive unit 20 in a forward direction. Motorized wheels 224 are also operable to rotate in a second direction to propel mobile drive unit 20 in a backward direction. In the illustrated embodiment, drive module 200 is also configured to rotate mobile drive unit 20 by rotating motorized wheels 224 in different directions from one another or by rotating motorized wheels 224 at different speed from one another.

Docking head 206, in particular embodiments of mobile drive unit 20, couples mobile drive unit 20 to inventory holder 30 and/or supports inventory holder 30 when mobile drive unit 20 is docked to inventory holder 30. Docking head 206 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 206 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 206 and a surface of inventory holder 30 may induce translational and rotational movement in inventory holder 30 when docking head 206 moves and rotates, respectively. As a result, mobile drive unit 20 may be able to manipulate inventory holder 30 by moving or rotating docking head 206, either independently or as a part of the movement of mobile drive unit 20 as a whole. In particular embodiments, mobile drive unit 20 may be capable of independently selectively rotating an inventory holder 30 while mobile drive unit 20 is moving in a translational direction and/or turning from one translational direction to a second translational direction.

Docking actuator 208 moves docking head 206 vertically towards inventory holder 30 to facilitate docking of mobile drive unit 20 and inventory holder 30. Docking actuator 208 may also be capable of adjusting the position or orientation of docking head 110 in other suitable manners to facilitate docking. Docking actuator 208 may include any appropriate components, based on the configuration of mobile drive unit 20 and inventory holder 30, for moving docking head 206 or otherwise adjusting the position or orientation of docking head 206. For example, in the illustrated embodiment, docking actuator 208 includes a motorized shaft attached to the center of docking head 206. The motorized shaft is operable to lift docking head 206 as appropriate for docking with inventory holder 30.

Active marker transceivers 240 and/or 240a represent one or more sensors, detectors, emitters, transmitters and/or other components suitable for communicating with active markers 22. For example, active marker transceiver 240 and/or 240a may be capable of determining the location of mobile drive unit 20 by communicating with active marker 22 and/or comparing the location of active marker 22 to its location on a virtual map stored in memory of the active marker transceiver and/or control module 210. For example, in particular embodiments, workspace 70 associated with inventory system 10 includes a number of active markers 22 that mark points on a two-dimensional grid that covers all or a portion of workspace 70. In such embodiments, active marker transceiver 240 and/or 240a may include a camera and suitable image- and/or video-processing components, such as an appropriately-programmed digital signal processor, to allow active marker transceiver 240 and 240a to detect active markers 22 and/or receive signals emitted by the active marker 22 while the active marker 22 is within the camera's field of view. In some embodiments, active marker transceivers 240 and/or 240a may detect pulses in ambient light signals transmitted by active markers 22. For example, active markers 22 may be able to modulate the light signals emitted in order to induce pulses in the ambient light in workspace 70. In such embodiments, active markers 22 may be able to address instructions to particular mobile drive units 20 using a unique identifier of each mobile drive unit 20. Control module 210 may store location information, such as a virtual map, that active marker transceiver 240 and/or 240a update as active marker transceiver 240 and/or 240a detects active markers 22. As a result, active marker transceiver 240 and/or 240a may utilize active markers 22 to maintain an accurate indication of the location of mobile drive unit 20 and to aid in navigation when moving within workspace 70. Active marker transceiver 240 and/or 240a may additionally and/or alternatively be capable of recognizing instructions associated with task 60 based on information received from active marker 22. For example, the information may be interpreted by active transceiver 240 and/or 240a and/or control module 210 as instructions to activate docking actuator 208 to lift or lower an inventory holder 30. The information may also be interpreted as instructions to move mobile drive unit 20 and/or accomplish one or more of various rotation maneuvers, which mobile drive unit 20 may accomplish by actuating the wheels 224 using wheel actuators 228 in an appropriate manner.

Active marker transceiver 240 and/or 240a may additionally and/or alternatively include a and emitter and/or transmitter operable to communicate with active markers 22. For example, active marker transceiver 240 and/or 240a may include one or more LEDs operable to emit light signals to active marker 22 in a manner expected by active marker 22. Active marker transceiver 240 and/or 240a may be capable of transmitting presence information, path information, state information, or other information associated with the operation of mobile drive unit 20 to an active marker 22.

Holder sensor 250 represents one or more sensors, detectors, or other components suitable for detecting inventory holder 30 and/or determining, in any appropriate manner, the location of inventory holder 30, as an absolute location or as a position relative to mobile drive unit 20. Holder sensor 250 may be capable of detecting the location of a particular portion of inventory holder 30 or inventory holder 30 as a whole. Mobile drive unit 20 may then use the detected information for docking with or otherwise interacting with inventory holder 30. In some embodiments, holder sensor 250 may be utilized such that docking actuator 208 is operable to lift inventory holder 30 by substantially aligning a portion of mobile drive unit 20 with a portion of inventory holder 30. For example, holder sensor 250 may be utilized to determine that a vertical axis at the center of gravity of the mobile drive unit 20 is substantially aligned with a vertical axis of the center of gravity of the inventory holder 30 before lifting. Thus, when inventory holder 30 is lifted, the center axes the inventory holder 30 and mobile drive unit 20 may be substantially aligned.

Obstacle sensor 260 represents one or more sensors capable of detecting objects located in one or more different directions in which mobile drive unit 20 is capable of moving. Obstacle sensor 260 may utilize any appropriate components and techniques, including optical, radar, sonar, pressure-sensing and/or other types of detection devices appropriate to detect objects located in the direction of travel of mobile drive unit 20. In particular embodiments, obstacle sensor 260 may transmit information describing objects it detects to control module 210 to be used by control module 210 to identify obstacles and to take appropriate remedial actions to prevent mobile drive unit 20 from colliding with obstacles and/or other objects. Additionally, in particular embodiments, obstacle sensor 260 may also be capable of detecting state information transmitted by other mobile drive units 20. For example, in particular embodiments, identification signal transmitter 262 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units. In addition, in particular embodiments, such information may be transmitted to active markers 22 using active marker transceiver 240 and/or 240a.

Obstacle sensor 260 may also detect signals transmitted by other mobile drive units 20 operating in the vicinity of the illustrated mobile drive unit 20. For example, in particular embodiments of inventory system 10, one or more mobile drive units 20 may include an identification signal transmitter 262 that transmits a drive identification signal. The drive identification signal indicates to other mobile drive units 20 that the object transmitting the drive identification signal is in fact a mobile drive unit. Identification signal transmitter 262 may be capable of transmitting infrared, ultraviolet, audio, visible light, radio, and/or other suitable signals that indicate to recipients that the transmitting device is a mobile drive unit 20. In addition, in particular embodiments, such information may be received from active markers 22 using active marker transceiver 240 and/or 240a.

Control module 210 monitors and/or controls operation of drive module 200 and docking actuator 208. Control module 210 may also receive information from various sensors of the mobile drive unit 20 and/or adjust the operation of drive module 200, docking actuator 208, and/or other components of mobile drive unit 20 based on the sensed information. Additionally, in particular embodiments, mobile drive unit 20 may be configured to communicate with management module 15. Control module 210 may receive information transmitted to mobile drive unit 20 by management module 15 and/or management module 15 utilizing appropriate communication components of mobile drive unit 20, such as active marker transceiver 240 and/or 240a and/or a wireless interface. Control module 210 may include any appropriate hardware and/or software suitable to provide the described functionality. In particular embodiments, control module 210 includes a general-purpose microprocessor programmed to provide the described functionality. Additionally, control module 210 may include all or portions of docking actuator 208, drive module 200, active marker transceiver 240 and/or 240a, and/or holder sensor 250, and/or share components with any of these elements of mobile drive unit 20. Control module 210 may coordinate the movement of wheels 224 and the rotation of docking head 206 in order to accomplish various rotation maneuvers. Control module 210 may, additionally or alternatively, independently control docking head actuator 208 and actuators 228.

Moreover, in particular embodiments, control module 210 may include hardware and software located in components that are physically distinct from the device that houses drive module 200, docking actuator 208, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 200, docking actuator 208, and other appropriate components of mobile drive unit 20. This drive agent may be responsible for requesting and receiving tasks 60, requesting and receiving routes, transmitting state information associated with mobile drive unit 20, and/or otherwise interacting with management module 15 and other components of inventory system 10 on behalf of the device that physically houses drive module 200, docking actuator 208, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 200, docking actuator 208, and/or the other components of mobile drive unit 20 described above.

While FIG. 3 illustrates a particular embodiment of mobile drive unit 20 containing certain components and configured to operate in a particular manner, mobile drive unit 20 may represent any appropriate component and/or collection of components configured to transport and/or facilitate the transport of inventory holders 30. For example, mobile drive unit 20 may represent all or part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task 60.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 4:
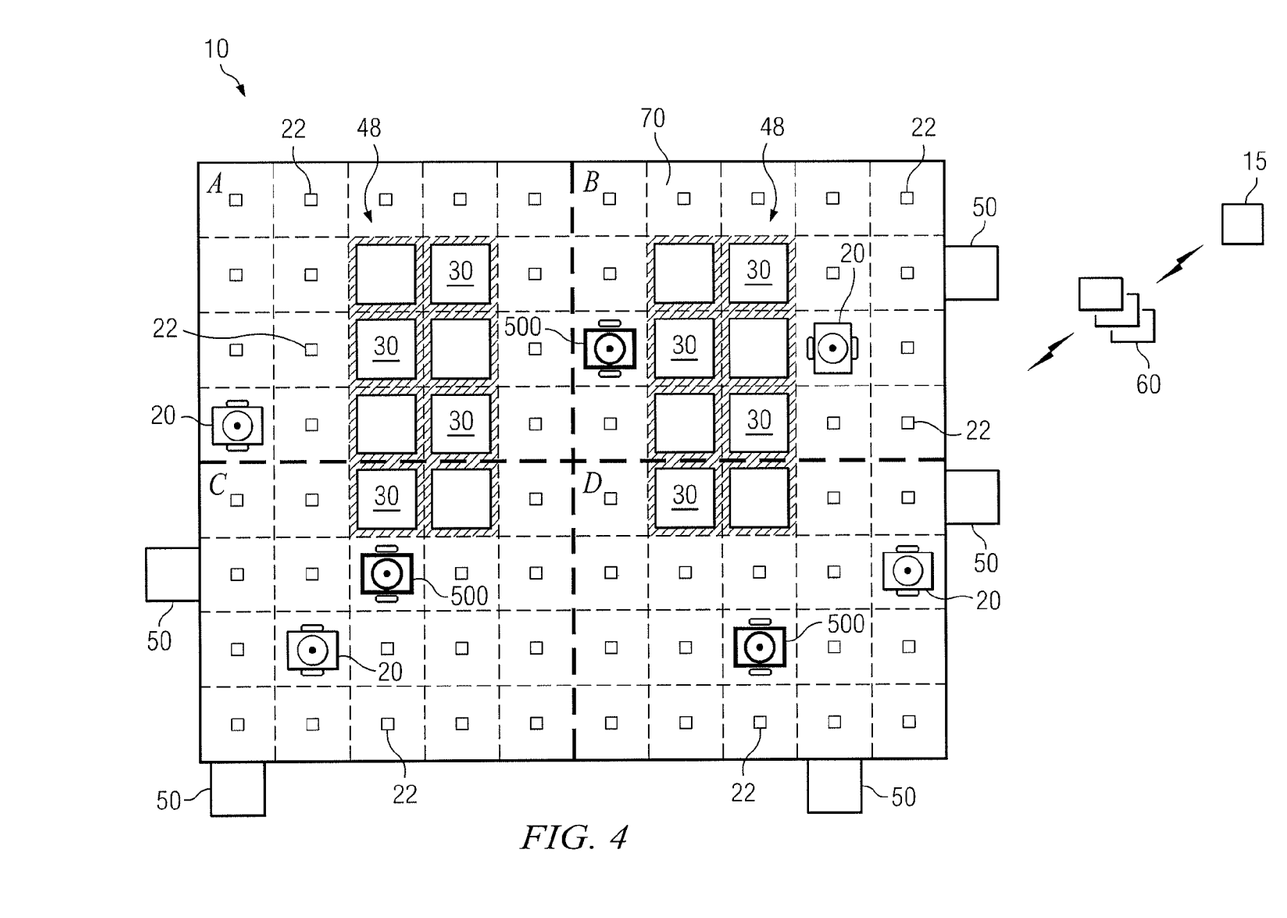
FIG. 4 illustrates an example system for controlling a mobile drive unit using a mobile drive unit hierarchy and active markers.

FIG. 4 illustrates an example system 10 for controlling a mobile drive unit using a mobile drive unit hierarchy and active markers 22. In particular embodiments, workspace 70 may be divided into various sub-regions. A hierarchy of mobile drive units 20 within each region may be established to facilitate the administration and coordination of tasks 60 within each sub-region. For example, one or more mobile drive units 20 may be designated as a master mobile drive unit 500 for a given region. Master mobile drive unit 500 may receive tasks 60 associated with the various components in the sub-region of master mobile drive unit 500. Master mobile drive unit 500 may then be responsible for coordinating and administering those tasks 60 within the sub-region. In some embodiments, master mobile drive unit 500 may be responsible for assigning tasks 60 to itself in addition to other mobile drive units 20. Thus, master mobile drive unit 500 may perform the tasks of mobile drive unit 20 in addition to coordinating and administering tasks 60. In some embodiments, master mobile drive units 500 may also be responsible for path planning and route reservation activities for various mobile drive units 20 within the respective sub-region of master mobile drive unit 500.

Master mobile drive unit 500 may communicate information and/or tasks 60 to various mobile drive units 20 within the sub-region by communicating with active markers 22 at fixed locations within the sub-region. For example, master mobile drive unit 500 may determine that in association with a task 60, a given mobile drive unit 20 should move from one location to another. Master mobile drive unit 500 may communicate appropriate instructions to an appropriate active marker 22 to communicate the instructions to the mobile drive unit 20. In some embodiments, master mobile drive unit 500 may divide task 60 into sub-tasks that are each associated with an active marker 22. For example, if a task 60 involves a mobile drive unit 20 moving along a path that traverses segments between several active markers 22, the master mobile drive unit may transmit divide the task by segments and transmit the successive segments to each active marker 22 in the path. Thus, mobile drive unit 20 may traverse active marker 22 to active marker 22 along the path, where each active marker 22 communicates the next segment of the path. Although a particular way of transmitting path information via active markers 22 is described, any suitable method can be used. For example, master mobile drive unit 500 may transmit an entire path to the destination to mobile drive unit 20 via active marker 22 and/or a wireless interface that communicates directly with other mobile drive units 20.

Master mobile drive unit 500 may transmit instructions for mobile drive units 20 to complete various tasks 60 within a sub-region, such as to lift or lower inventory holder 30 and/or perform a rotation maneuver. In some embodiments, a given task 60 may involve mobile drive unit 20 moving from one sub-region to another. In such instances, master mobile drive unit 500 may determine to hand off control of that mobile drive unit 20 to another master mobile drive unit 500 of the other sub-region. In addition or in the alternative, master mobile drive unit 500 in one sub-region may retain control of mobile drive unit 20 until the task 60 in the other sub-region is completed.

As illustrated in FIG. 4, workspace 70 is divided into sub-regions A, B, C, and D. Although a particular configuration of sub-regions is illustrated, any particular geometry can be used. Each of master mobile drive units 500a, 500b, 500c and 500d are responsible for administering to the mobile drive units 20 within their respective sub-regions. Mobile drive units 500a-500d may each receive instructions wirelessly from management module 15 and may communicate instructions to various mobile drive units 20 via active markers 22 according to any of the aforementioned techniques.

Figure 5:
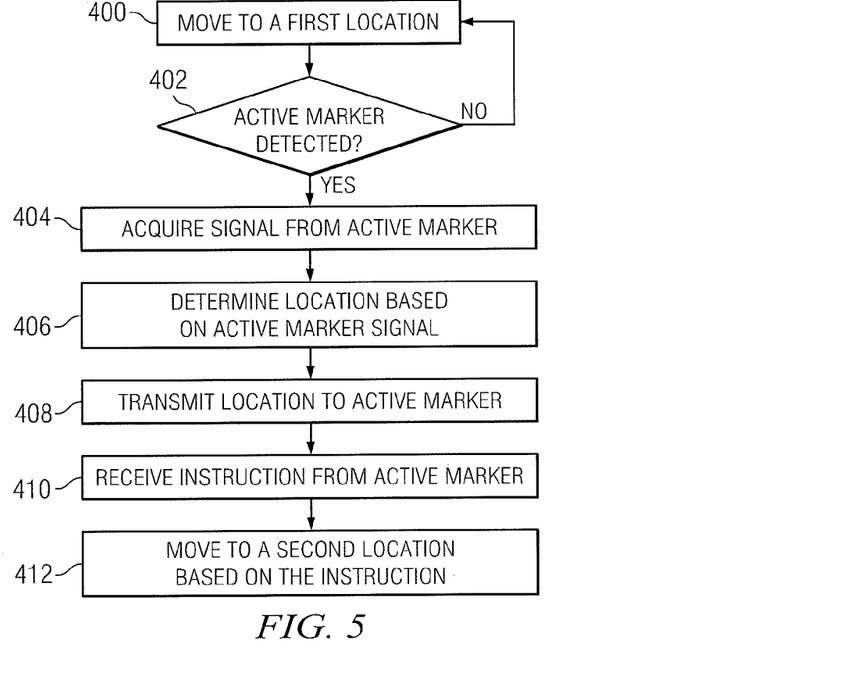
FIG. 5 illustrates an example method of controlling a mobile drive unit with active markers.

FIG. 5 illustrates an example method of controlling a mobile drive unit with active markers 22. At step 400, mobile drive unit 20 moves towards a location. As mobile drive unit 20 moves towards the location, at step 402, mobile drive unit 20 may actively detect whether active marker 22 is within range. If active marker 22 is not in range, the mobile drive unit 20 may continue moving towards the location.

If at step 402, active marker 22 comes into range of active marker transceiver 240 and/or 240a of mobile drive unit 20, mobile drive unit 20 may begin to acquire a signal from active marker 22. The signal from active marker 22 may be acquired by mobile drive unit 20 at step 404. At step 406, the signal from active marker 22 may be used by mobile drive unit 20 to determine the location of mobile drive unit 20 within workspace 70. For example, the signal may include identifying information of active marker 22 that allows mobile drive unit 20 to determine the location of the active marker 22 within a virtual map of workspace 70. Based on the location determined by the signal, mobile drive unit 20 may update its internal location and/or may update its progress along a given path towards a destination. For example, the mobile drive unit 20 may update its virtual map. Mobile drive unit 20 may additionally or alternatively receive status information related to other components of system 10, which may be used by mobile drive unit 20 to update the location of other movable components of system 10, such as other mobile drive units 20 and/or inventory holders 30.

At step 408, the mobile drive unit 20 may communicate to active marker 22 presence information indicating the presence and/or identity of the mobile drive unit 20 at active marker 22. Active marker 22 may communicate this presence information to other active markers 22 and/or management module 15. Management module 15 may store a virtual map of the components of workspace 70 and/or may analyze presence information received from active marker 22 to detect the presence of mobile drive unit 20 at active marker 22. By comparing the presence of mobile drive unit 20 at a particular active marker 22 to the virtual map, management module 15 may determine the location of mobile drive unit 20 within the virtual map. Thus, the presence information may be used by various other active markers 22 within workspace 70 to update the location status of the mobile drive unit 20 to the other components of system 10. As another example, presence information may, in some embodiments, be relayed by active marker 22 to a master mobile drive unit 500. In some embodiments, mobile drive unit 20 may transmit status information to active marker 22 in addition or alternatively to location status. For example, status information may include a repair status, maintenance status, fuel level status or other capability status associated with mobile drive unit 20.

At step 410, active marker 22 may communicate additional information, such as instructions, to the mobile drive unit 20. The information may be received by mobile drive unit 20. The information may indicate a new instruction and/or may indicate the next sub-task of an existing task 60. For example, mobile drive unit 20 may receive information identifying additional instructions and/or identifying the next segment of the path to its destination. The instructions may include directions to a destination within workspace 70. As another example, active marker 22 may instruct mobile drive unit 20 to lift and/or lower inventory holder 30 at the location of active marker 22, execute a rotation maneuver of inventory holder 30 being carried by mobile drive unit 20 and/or turn of mobile drive unit 20. Active marker 22 may, in some embodiments, indicate to mobile drive unit 20 to continue moving along a path to a subsequent active marker 22. Active marker 22 may communicate the next segment of the path to mobile drive unit 20. In some embodiments, management module 15 may determine an appropriate path for mobile drive unit 20 within workspace 70. Management module 15 may transmit, in whole or in part, the path to a given active marker 22. In some embodiments, management module 15 determines each segment of the path to a given destination, where each segment may be between two active markers. Management module 15 may, for example, transmit the first segment of the path to the first active marker in the path, transmit the second segment of the path to the second active marker in the path, and so on until the destination is reached. In some embodiments, management module 15 is capable of determining optimal paths for the various mobile drive units 20 within workspace 70. For example, management module 15 may receive orders 60 for various inventory items. Management module 15 may determine locations of the inventory items needed by orders 60 within the various locations of inventory holders 30. Management module 15 may, based on the locations of inventory holders 30 and various mobile drive units 20, determine paths that instruct mobile drive units 20 to move to the locations of inventory holders 30 and transport the inventory holders 30 to inventory stations 50. Management module 15 may determine the paths such that the overall travel time of mobile drive units 20 is optimized and/or reduced. For example, the distances of the various mobile drive units 20 from the inventory holders 30 may be taken into account.

At step 412, based on the information received from active marker 22, mobile drive unit 20 may move to a second location. The second location, could, for example, by a location at which an inventory holder 30 is stored within workspace 70. The information may represent an instruction to move to the second location. In response to receiving the instruction to complete a given task 60, mobile drive unit 20 may perform any number and combination of maneuvers in order to complete task 60. In addition or in the alternative to moving to a second location, the information may represent an instruction to complete any number and/or combinations of tasks 60 within workspace 70. Mobile drive unit 20 may complete various tasks 60 based on the information received by active marker 22. For example, mobile drive unit 20 may lift an inventory holder 30 and/or complete a rotation maneuver. In some embodiments, mobile drive unit 20 may lift inventory holder 30 at the second location. In some embodiments, while moving to a location within workspace 70 along a path, such as to the second location, mobile drive unit 20 may detect obstacles in the path. For example, another mobile drive unit 20, human operator, or other object may be blocking the mobile drive unit 20 from proceeding along the path. Mobile drive unit 20 may be capable of, in response to detecting an obstacle, calculate an alternate path around the obstacle. In some embodiments, mobile drive unit 20 may additionally or alternatively request a new path from management module 15. After receiving or calculating a new path, mobile drive unit 20 may proceed along the new path to avoid the obstacle.

After task 60 received from the active marker 22 is complete at step 412, mobile drive unit 20 may then indicate its availability to complete another task 60 to active marker 22. If management module 15 has assigned another task to mobile drive unit 20, management module 15 may transmit instructions to the active marker 22 at the second location, such as a storage location. For example, an additional instruction may be to transport the inventory holder in storage to an inventory station. At the inventory station, inventory items may be removed from the inventory holder and used to fill an order 60. After the tasks associated with inventory station 50 are complete, mobile drive unit 20 may receive an instruction from an active marker 22 at the inventory station to proceed to another location. For example, mobile drive unit 20 may transport an inventory holder storing a completed order 60 to a shipping dock and/or storage area for completed orders in preparation for shipping. Mobile drive unit 20 may be instructed by active marker 22 to undock with inventory holder 30 at any appropriate location, such as at the shipping dock or other storage area within workspace 70. Mobile drive unit 20 may additionally or alternatively proceed to the location of another active marker 22 that may be designated as a waiting location for mobile drive unit 20 while waiting to receive another task 60. Thus, when management module 15 is ready to assign another task 60 to mobile drive unit 20, task 60 may be transmitted to the active marker 22 associated with the waiting location of mobile drive unit 20, and the method may repeat.

Figure 6:
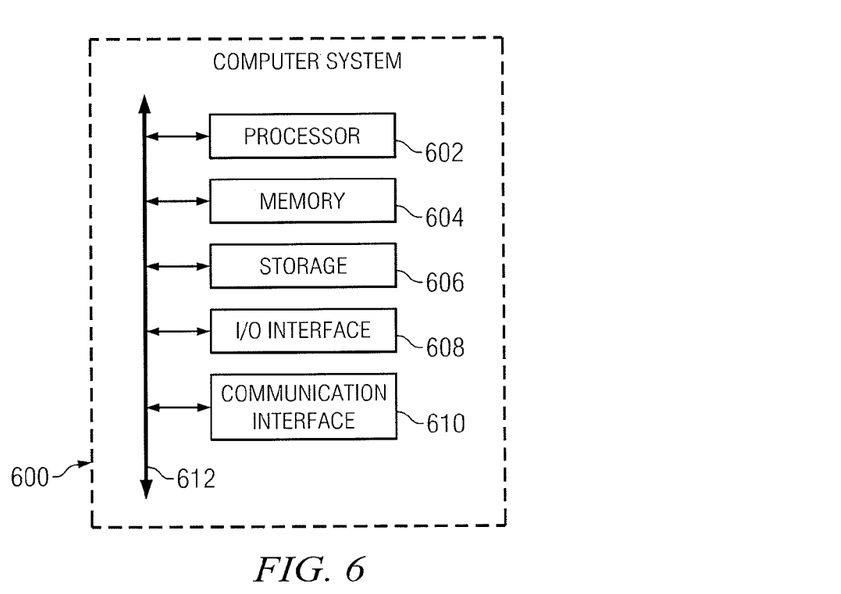
FIG. 6 illustrates an example computer system that may be used for one or more portions of the example system of FIG. 1, according to certain embodiments of the present disclosure.

FIG. 6 illustrates an example computer system 600 that may be used for one or more portions of the systems and method disclosed herein. In particular embodiments, one or more computer systems 600 perform one or more steps of one or more methods described or illustrated herein. In particular embodiments, one or more computer systems 600 provide functionality described or illustrated herein, such as, for example, any appropriate component of system 10, such as management module 15, mobile drive unit 20 and/or active marker 22. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. Although this disclosure describes and illustrates a particular processor, this disclosure contemplates any suitable processor.

In particular embodiments, memory 604 includes main memory for storing instructions for processor 602 to execute or data for processor 602 to operate on. In certain embodiments, memory 604 may be memory includes in any of the system 10 components discussed above, such as management module 15, mobile drive unit 20 and/or active marker 22. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 02 to memory 604. Bus 612 may include one or more memory buses, as described below. In particular embodiments, one or more memory management units (MMUs) reside between processor 602 and memory 604 and facilitate accesses to memory 604 requested by processor 602. Although this disclosure describes and illustrates particular memory, this disclosure contemplates any suitable memory.

In particular embodiments, storage 606 includes mass storage for data or instructions. In certain embodiments, storage 606 may be included in any appropriate component of system 10, including management module 15, mobile drive unit 20 and/or active marker 22 Storage 606 may include removable or non-removable (i.e., fixed) media, where appropriate. Storage 606 may be internal or external to computer system 600, where appropriate. In particular embodiments, storage 606 is non-volatile, solid-state memory. Where appropriate, storage 606 may include one or more storages 706. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it. Although this disclosure describes and illustrates a particular communication interface, this disclosure contemplates any suitable communication interface.

In particular embodiments, bus 612 includes hardware, software, or both coupling components of computer system 600 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 10 are illustrated, it should be appreciated that the teaching of the present disclosure may be applied to any type and number of inventory systems. For example, inventory system 10 may represent a merchandise return facility. In such embodiments, inventory items may represent merchandise returned by customers. Such merchandise may be stored in inventory holders 130 when received at the facility from individual customers. At appropriate times, large numbers of units may be removed from a particular inventory holder 30 and transferred at inventory station 50 to an order holder. For example, certain inventory items may be associated with a product recall, causing those inventory items to be returned in high volume. As another example, system 10 may represent a manufacturing facility, and inventory items may represent individual components of a manufacturing kit. Thus, individual items of the manufacturing kit may be stored in inventory holders 30. Orders for manufactured products may be assembled from the individual items at inventory station 50. Final products may be transported by mobile drive units 20 using order holders and may be shipped to the appropriate destination. Thus, although a number of example embodiments are described in the present disclosure, inventory system 10 may, in general, represent any suitable facility or system for storing or processing inventory items, and inventory items may represent objects of any type suitable for storage, retrieval and/or processing in a particular inventory system 10.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A system of controlling a mobile drive unit with active markers, comprising:
    a plurality of active markers in a two-dimensional pattern of active markers, an active marker operable to emit one or more instructions to a mobile drive unit proximate to the active marker;
    a management module operable to send instructions to the plurality of active markers;
    a mobile drive unit operable to:
    receive, at a first location, a signal emitted by the active marker at the first location;
        analyze the signal to determine an instruction, the instruction comprising directions to move to a second location;
        based on the instruction, move to the second location according to the instructions.

2. The system of claim 1, wherein:
    the second location comprises a storage location of an inventory holder;
    the instruction further comprises a first instruction to lift the inventory holder at the storage location; and
    the mobile drive unit is further operable to:
        receive a second instruction from a second active marker at the storage location, the second instruction comprising directions to move the inventory holder to an inventory station.

3. The system of claim 2, the mobile drive unit further operable to:
    receive a third instruction from a third active marker at the inventory station, the third instruction comprising directions to move the inventory holder to a shipping location, the mobile drive unit operable to undock from the inventory holder at the shipping location.

4. The system of claim 1, the management module further operable to:
    receive a plurality of orders for inventory items stored by a plurality of inventory holders within a workspace;
    determine a plurality of paths for a each of a plurality of mobile drive units to retrieve one of the inventory holders and transport the inventory holder to an inventory station; and
    control each of the plurality of mobile drive units by transmitting instructions to the plurality of active markers such that a particular mobile drive unit receives a particular instruction from a particular active marker to proceed along a portion of a particular path as the particular mobile drive unit proceeds along the particular path.

5. The system of claim 1, wherein the two-dimensional pattern of active markers are disposed above the mobile drive unit.

6. A method of controlling a mobile drive unit, comprising:
   detecting, by a mobile drive unit at a first location, an active marker at the first location, the mobile drive unit comprising a self-powered robotic device configured to move independently in a workspace in response to instructions received from the active marker;
   transmitting, by a management module, an instruction to the active marker;
   emitting, by the active marker, a signal detectable by the mobile drive unit, the signal comprising the instruction;
   receiving, by the mobile drive unit, the instruction from the active marker for the mobile drive unit to perform a task.

7. The method of claim 6, further comprising receiving direction instructions from the active marker.

8. The method of claim 7, further comprising moving the mobile drive unit to a second location according to the direction instructions.

9. The method of claim 6, wherein the signal comprises a light signal.

10. The method of claim 6, wherein the task is associated with lifting an inventory holder and transporting the inventory holder to a second location.

11. The method of claim 6, further comprising transmitting information from the mobile drive unit to the active marker, the information comprises a status of the mobile drive unit.

12. The method claim 6, further comprising:
    detecting, by the mobile drive unit, that an obstacle is blocking a path of the mobile drive unit; and
    determining a path to avoid the obstacle.

13. The method of claim 12, wherein the path to avoid the obstacle is calculated by the mobile drive unit.

14. The method of claim 6, wherein the active marker is one of a plurality of active markers arranged in a two dimensional grid in a fulfillment facility.

15. The method of claim 14, wherein the active marker comprises a first active marker and the method further comprises:
    determining, by the management module, a path from the first location to a second active marker;
    wherein transmitting, by the management module, the instruction to the active marker comprises transmitting an instruction to the first active marker for the mobile drive unit to move along at least a portion of the path to the second active marker.

16. The method of claim 14, wherein the active marker comprises a first active marker and the method further comprises:
    determining, by the management module, a path from the first location to a second location, the path comprising a first segment from the first active marker to a second active marker in the two-dimensional grid and a second segment from the second active marker to a third active marker in the two-dimensional grid;
    transmitting, by the management module, a first instruction for the mobile drive unit to move along the first segment to the first active marker and a second instruction for the mobile drive unit to move along the second segment to the second active marker.

17. The method of claim 6, further comprising:
    determining, by the management module, an optimal path for mobile drive unit to transport an inventory holder to an inventory station.

18. A system for controlling a mobile drive unit with active markers, comprising:
    a first mobile drive unit; and
    an active marker operable to:
        communicate information indicating a location of the first mobile drive unit when the first mobile drive unit is proximate to the active marker; and
        transmit an instruction to the first mobile drive unit when the first mobile drive unit is proximate to the active marker, the instruction associated with a task for the mobile drive unit to perform.

19. The system of claim 18, wherein the first mobile drive unit is operable to:
    receive the instruction from the active marker, the instruction to transport an inventory holder to a second location; and
    transport the inventory holder to the second location based on the instruction.

20. The system of claim 18, wherein the active marker is further operable to:
    communicate at least a portion of a path within a workspace to the mobile drive unit; and
    wherein the instruction is for the mobile drive unit to proceed along the path from the location.

21. The system of claim 18, further comprising a second mobile drive unit operable to transmit information to the active marker, wherein the active maker is operable to communicate the instruction to the first mobile drive unit based on information received from the second mobile drive unit.

22. The system of claim 21, wherein the second mobile drive unit is further operable to receive tasks from a management module, the tasks associated with a plurality of mobile drive units.

* * * * *